United States Patent
Shah et al.

(10) Patent No.: US 9,177,352 B2
(45) Date of Patent: Nov. 3, 2015

(54) SELECTIVE MULTITHREADING FOR SPORADIC PROCESSOR WORKLOADS

(71) Applicant: Qualcomm Innovation Center, Inc., San Diego, CA (US)

(72) Inventors: Premal Shah, San Diego, CA (US); Omprakash Dhyade, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 198 days.

(21) Appl. No.: 14/149,701

(22) Filed: Jan. 7, 2014

(65) Prior Publication Data

US 2015/0193959 A1 Jul. 9, 2015

(51) Int. Cl.
*G06T 13/00* (2011.01)
*G06T 1/20* (2006.01)
*G06F 3/00* (2006.01)

(52) U.S. Cl.
CPC .... *G06T 1/20* (2013.01); *G06F 3/00* (2013.01)

(58) Field of Classification Search
None
See application file for complete search history.

(56) References Cited

U.S. PATENT DOCUMENTS

| | | | | |
|---|---|---|---|---|
| 2008/0276056 A1* | 11/2008 | Giacomoni | ............ | G06F 9/544 711/159 |
| 2008/0310555 A1* | 12/2008 | Kee | ........ | G06F 9/5077 375/340 |
| 2012/0060161 A1* | 3/2012 | Joung | ........... | G06F 9/5038 718/102 |

* cited by examiner

*Primary Examiner* — Kee M Tung
*Assistant Examiner* — Frank Chen
(74) *Attorney, Agent, or Firm* — Neugeboren O'Dowd PC

(57) ABSTRACT

Systems and methods for processing user-interface animations are disclosed. The method may include processing a first frame of a user-interface animation with a first processing core, monitoring a processing time of the first frame of the user-interface animation relative to a first synchronization pulse, and processing, if the elapsed processing time exceeds a threshold, a first portion of the user-interface animation with the first processing core and a second portion of the user-interface animation with a second processing core. Processing of a next frame of the user-interface animation may be initiated with the first processing core while the second processing core is processing the second portion of the user-interface animation.

19 Claims, 5 Drawing Sheets

SELECTIVE MULTITHREADING FOR SPORADIC PROCESSOR WORKLOADS

BACKGROUND

1. Field

The present disclosed embodiments relate generally to computing devices, and more specifically to multithreading on processors of computing devices.

2. Background

Computing devices including devices such as smartphones, tablet computers, gaming devices, and laptop computers are now ubiquitous. These computing devices are now capable of running a variety of applications (also referred to as "apps") and many of these devices include multiple processors to process tasks that are associated with apps. In many instances, multiple processors are integrated as a collection of processor cores within a single functional subsystem. It is known that the processing load on a mobile device may be apportioned to the multiple cores. Some sophisticated devices, for example, have multiple core processors that may be operated asynchronously at different frequencies. On these types of devices, the amount of work that is performed on each processor may be monitored and controlled by a CPU governor to meet workloads.

A user's experience on a computing device is generally dictated by how smooth the user interface ("UI") animation runs on the device. UI animations on Android-based devices, application scrolls (e.g., browser scroll, email scroll, home launcher scrolls etc.), and the visually attractive animations that are displayed in connection with application launches present an important use-case of periodic workload on the CPU that is also sporadic in nature. Usually a performance benchmark places fixed-sized loads on the CPU, which allows the system to latch on the right clock frequency when running the benchmark. If a particular processing core has a heavy load, the frequency of that processing core may be increased. If a processing core has a relatively low load or is idle, the frequency of that core may be decreased (e.g., to reduce power consumption).

The Linux operating system for example, may use an on demand governor, which monitors the workload on each processor and adjusts the corresponding clock frequency based on the workload. The adjustment of the clock frequency may be heuristic based and may provide power benefits when operating properly. This approach to adjusting the CPU clock frequency works well if the workload is overall consistent, which is usually the case for many of the typical benchmarks. But the on demand governor does not scale well when the periodic workload also becomes sporadic because there is no consistent history associated with the sporadic workload.

As a consequence, sporadic workloads are a challenge for the governor, and to finish a periodic workload in a timely manner, a known (and non-optimal system solution) is to run a processor locked at higher clock frequency for user-interface workloads. Similarly, other CPU governors (e.g., the Interactive governor) respond more aggressively and increase processor clock frequencies when servicing sporadic/interactive workloads. These governor-based approaches that increase processor clock frequencies adversely impact power consumption, they are merely "best effort," and these governor-based approaches are not deterministic with respect to changing workloads. In short, existing approaches to handling sporadic workloads either result in "stuttering," undesirable power consumption, and/or poor application performance.

SUMMARY

Aspects of the present invention may be characterized as a method for processing user-interface animations on a computing device. The method may include processing a first frame of a user-interface animation with a first processing core and monitoring a processing time of the first frame of the user-interface animation relative to a first synchronization pulse. If the elapsed processing time exceeds a threshold, a first portion of the user-interface animation is processed with the first processing core and a second portion of the user-interface animation is processed with a second processing core. Processing of a next frame of the user-interface animation is then initiated at substantially the same time as a second synchronization pulse while the second processing core is processing the second portion of the first frame.

Other aspects may be characterized as computing device that includes means for processing a first frame of a user-interface animation with a first processing core and means for monitoring a processing time of the first frame of the user-interface animation relative to a first synchronization pulse. The computing device also includes means for processing, if the elapsed processing time exceeds a threshold, a first portion of the user-interface animation with the first processing core and means for processing a second portion of the user-interface animation with a second processing core. In addition, the computing device includes means for initiating, at substantially a same time as a second synchronization pulse, processing of a next frame of the user-interface animation with the first processing core while the second processing core is processing the second portion of the user-interface animation.

Yet another aspect may be characterized as a non-transitory, tangible processor readable storage medium, encoded with processor readable instructions to perform a method that includes processing a first frame of a user-interface animation with a first processing core and monitoring a processing time of the first frame of the user-interface animation relative to a first synchronization pulse. If the elapsed processing time exceeds a threshold, a first portion of the user-interface animation is processed with the first processing core and a second portion of the user-interface animation is processed with a second processing core. Processing of a next frame of the user-interface animation is then initiated at substantially a same time as a second synchronization pulse while the second processing core is processing the second portion of the user-interface animation.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
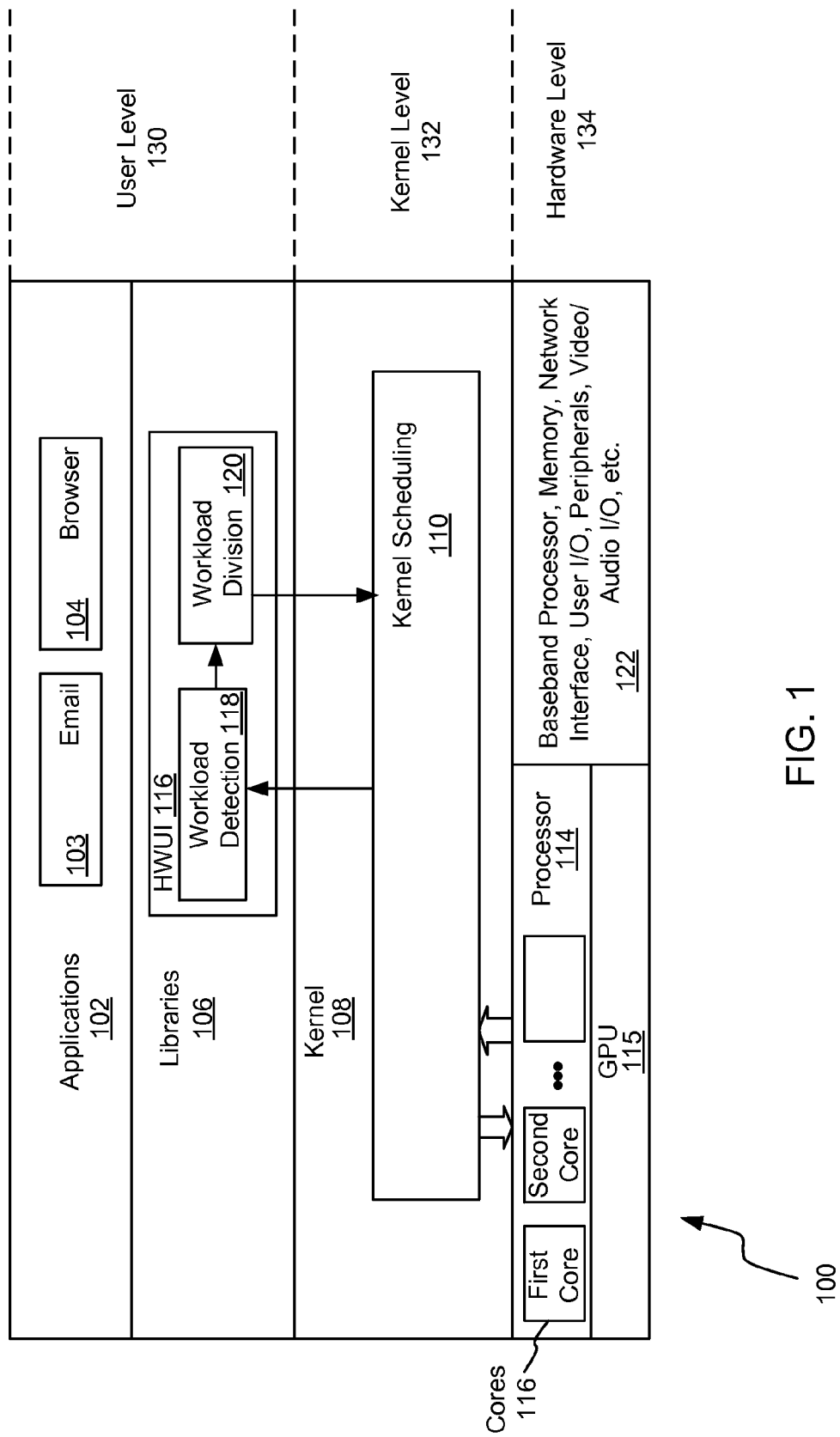
FIG. 1 is a block diagram illustrating components of a computing system.

Several embodiments disclosed herein provide more optimal handling of sporadic workloads for UI animations to improve the user experience. As discussed herein, many of these embodiments do not rely on system CPU governors to improve the user experience. Referring to FIG. 1 for example, it is a block diagram illustrating components of a computing system 100 (also referred to herein as a computing device 100). The block diagram includes applications 102 (e.g., an email application 103 and web browser 104) at the highest level of abstraction and hardware such as the applications processor 114 (which includes a plurality of processing cores 116) and a graphics processing unit ("GPU") 115 at the lowest level. As depicted, libraries 106 in this embodiment include a hardware user interface library ("HWUI") 116 that generally operates to render user-interfaces (e.g., using OpenGL), and the HWUI 116 in this embodiment includes a novel workload detection component 118 and a novel workload division component 120 that is in communication with a kernel scheduling component 110. Although the specific embodiment depicted in FIG. 1 depicts multiple processor cores 116 within a processor 114, it should be recognized that other embodiments include a plurality of processors that are not integrated within the processor 114. As a consequence, the operation of multiple processors is described herein in the context of both multiple processor cores 116, and more generally, multiple processors, which may include processor cores and discrete processors.

The one or more applications 102 may be realized by a variety of applications that operate via, or run on, the processor 114. For example, the one or more applications 102 may include an email application 103 (e.g., Gmail), a web browser 103 and associated plug-ins, entertainment applications (e.g., video games, video players), productivity applications (e.g., word processing, spreadsheet, publishing applications, video editing, photo editing applications), core applications (e.g., phone, contacts), and augmented reality applications.

As one of ordinary skill in the art will appreciate, the user-space 130 and kernel-space 132 components depicted in FIG. 1 may be realized by hardware in connection with processor-executable code stored in a non-transitory tangible processor readable medium such as nonvolatile memory, and can be executed by processor 114.

In general, the workload detection component 118 operates to detect how long a frame of animation is taking to process (e.g., on a first core of the processor 114), and if the processing time that elapses exceeds a threshold, the workload detection component 118 signals the workload division component 120 to divide the workload. More specifically, the workload division component 120 will prompt the kernel scheduling component 110 to divide the workload so that a prepare-stage of animation is processed by the first core and a render-stage of animation to executed by a second core of the processor 114. In this way, the prepare-stage may promptly begin in connection with a synchronization pulse to remove undesirable stuttering as discussed below.

Figure 2:
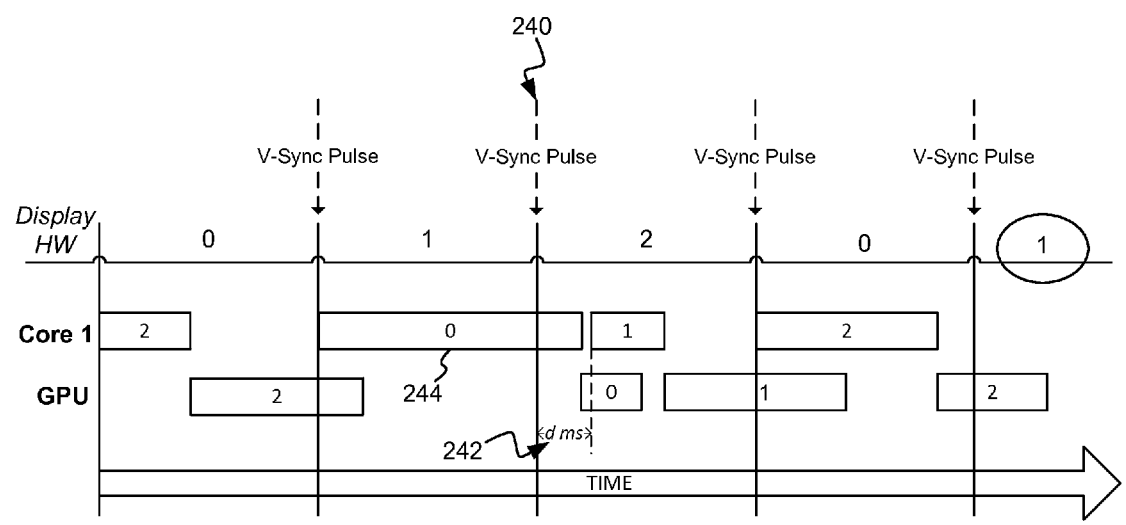
FIG. 2 is a timing diagram depicting the processing of a user interface animation with a single processor.

In many variations of the embodiment depicted in FIG. 1, the workload detection component 118 and workload division component 120 are additional constructs that are added to the Android mobile platform, which may be utilized to realize the application and library framework of the depicted computing device 100. As depicted in FIG. 2, UI animations on the Android platform are time-based with fixed periodicity controlled by the display panel refresh rate—depicted by a synchronization pulse (VSYNC pulse). At each VSYNC pulse, the UI frame workload is started and it must complete before the next VSYNC pulse to maintain smooth frame-displacement (e.g., UI element movement on the screen from frame n to frame n+1) throughout the time of the animation. Ideally, the feet-per-second of the UI animations is equal to the display panel refresh rate, but as depicted in FIG. 2, when the UI workload 244 for frame 0 does not complete by the time VSYNC pulse 240 occurs, frame number 1 renders with an additional displacement 242 of d milliseconds.

In connection with the Android platform, the processor 114 manages the UI elements (Android View Hierarchy) and prepares rendering work (e.g., using OpenGLES) for the GPU to finish. As is known to those of skill in the art, the UI workload on the Android platform may be split between the processor 114 and the GPU 115 (Android uses the GPU to do the UI rendering as an optimization). Based upon how the applications 102 are designed, both the processor 114 and the GPU 115 workloads can vary during the course of an animation sequence. Under ideal conditions, it is desirable for the application to be double buffered such that both processor 114 and the GPU 115 finish its workload in the current VSYNC cycle to show the rendered frame in the very next VSYNC cycle on the display.

Assuming the computing device 100 operates at a 60 Hz industry standard display refresh rate, the UI workload (processor 114+GPU 115) will have to be completed within 16.66 ms for a double-buffered solution. In a soft real time system (e.g., utilizing the Android platform) this is often not achievable, so in some modes of operation, triple buffering is utilized to allow for an extra frame of latency on the display and hence allow the workload (processor 114+GPU 115) to complete within 33.33 ms. But to show smooth frame-displacement on the screen, the processor 114 workload must start at the VSYNC pulse and complete before the next VSYNC pulse, but the processing performed by the GPU 115 can extend into the next VSYNC cycle.

Regardless of whether double-buffering or the more conservative triple-buffering is utilized, the processor 114 workload (albeit sporadic) must start at the VSYNC pulse and finish before the next VSYNC pulse to get smooth time based animations. Due to the sporadic nature of the processor 114 workload, the CPU governor often does not respond in time to increase the clock frequencies of the cores 116 when the workload becomes high. This results in a non-uniform displacement from frame to frame on the screen in the UI animation sequence. This is one of the types of UI stutter prevalent in time-based animations, which several embodiments discussed further herein avoid.

More specifically, embodiments disclosed herein address issues related to periodic workloads, which are also sporadic in nature with no specific history. Applicant has found for example, that only a portion of the workload needs to be absolutely periodic and a second part can be allowed some extra latency. As a consequence, the workload can be split into two distinct parts and run in two corresponding separate threads on the multicore processor 114. Assuming, for example, the periodic internal cycle for VSYNC is t milliseconds, the first part of the workload (which needs fixed periodicity) can at times, overlap with the second part of a previous workload in a given periodic interval of t milliseconds.

In addition, the workload may be selectively split so that the processing load on the computing device 100, as a whole, is handled more optimally. In some embodiments for example, if the processing of the workload extends beyond a certain time threshold (e.g., t/2 milliseconds) in a given periodic interval of t ms, the second part of the workload is split into a separate worker thread. This selective division of the workload avoids redundant multithreading overhead, and the workload splitting threshold can be tuned based on the particular use-case.

Figure 3:
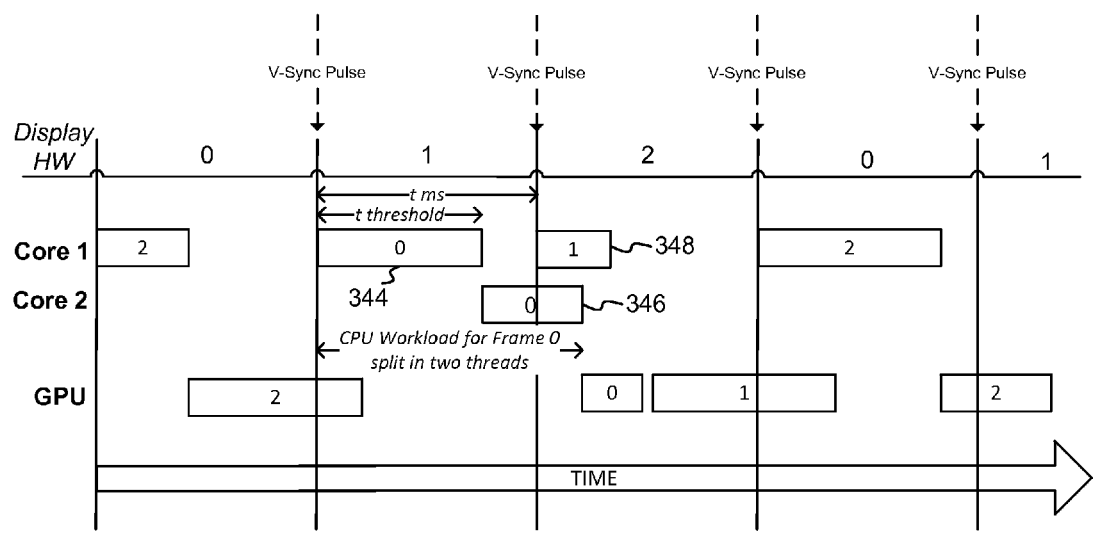
FIG. 3 is a timing diagram depicting the processing of a user-interface animation with two processors.

Referring next to FIG. 3, it depicts the splitting of the processor 114 workload into two threads. More specifically, FIG. 3 depicts an Android-based UI animation workload for a frame that is split into two distinct parts on the processor 114: 1) a prepare stage 344 and 2) a rendering stage 346. The prepare stage 344 includes managing the UI elements View Hierarchy; frame-to-frame displacement calculation; and recording graphics library ("GL") commands for rendering the current frame. The rendering stage 346 includes executing the recorded GL commands.

On a deferred GPU rendering architecture (e.g., an Adreno GPU rendering architecture) the processor 114 may pack the GL commands into a command buffer during the rendering stage 346, which is executed later by the GPU 115.

Figure 4:
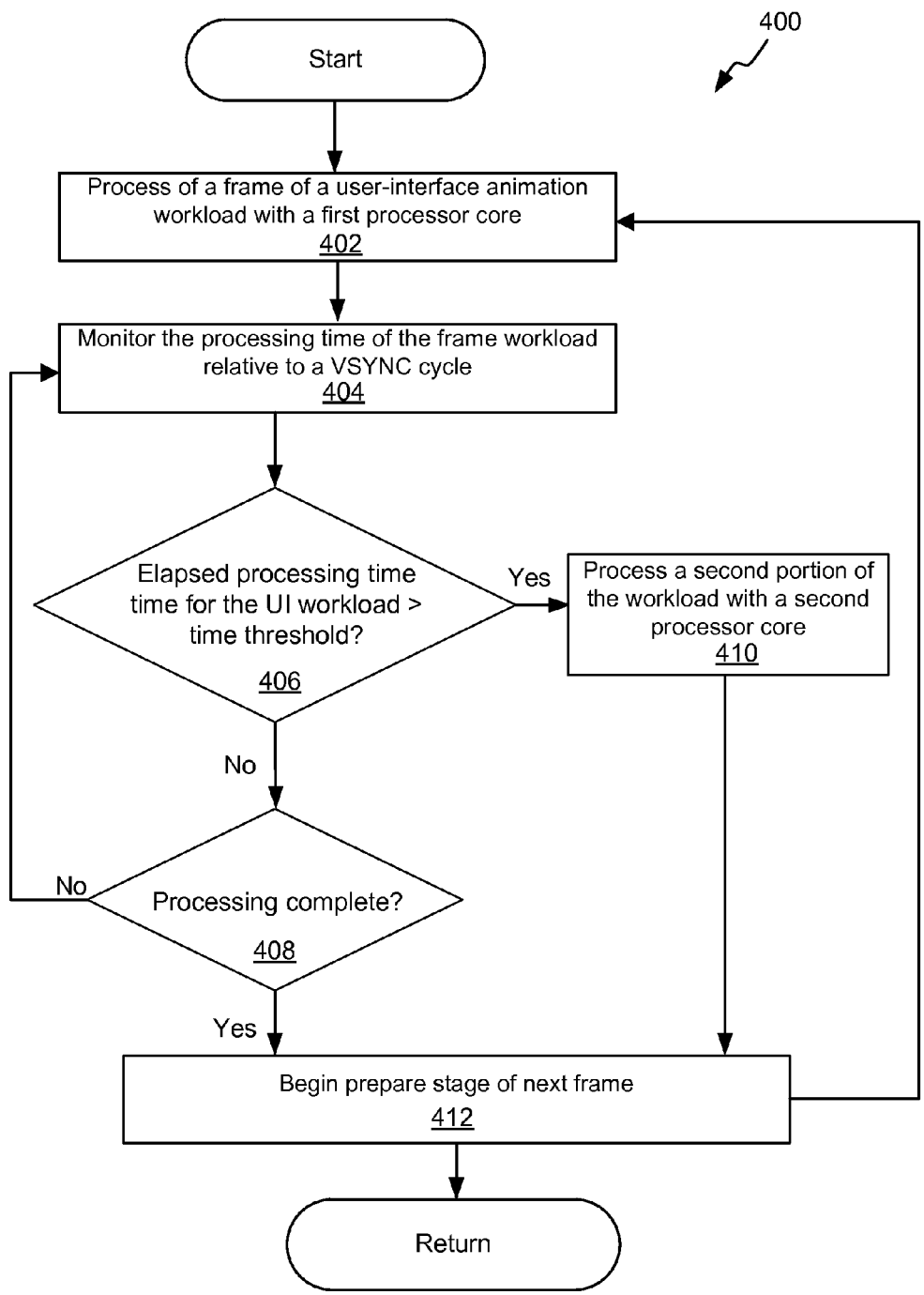
FIG. 4 is a flowchart depicting a method that may be traversed in connection with several embodiments.

While referring to FIG. 3, simultaneous reference is made to FIG. 4, which is a flowchart 400 depicting an exemplary method that may be traversed in connection with the embodiments disclosed herein. As shown in FIG. 4, when a frame of UI animation is initially processed, it is processed with a first processor core (Block 402), and the processing time for the frame is monitored relative to a synchronization (e.g., VSYNC) cycle (Block 404). As depicted, if an elapsed processing time for the workload has not exceeded a time threshold (Block 406) and the processing of the workload is not complete (Block 408), the processing of the workload continues until either the time threshold is exceeded (Block 406) or processing the workload is complete (Block 408).

If the time threshold has been exceeded (Block 406), then a second portion of the workload, the rendering stage 346, is carried out with a second processing core (Block 410). As depicted, while the rendering stage 346 is occurring, the prepare stage 348 for the next frame is initiated substantially co-currently with the VSYNC pulse so that the prepare stage 348 for the next frame begins while the render stage 346 for the previous frame is still in progress. As depicted, the prepare stage 344 and rendering stage 346 are executed in sequence for a given frame, but they are distinct in that the prepare stage of frame n+1 may overlap with the rendering stage of previous frame n. In addition, the prepare stages 344, 348 are carried out on separate cores from the render stage 346; thus, UI workload is effectively multithreaded in parallel.

The condition that the elapsed processing time exceed a threshold (Block 406) is implemented because multithreading adds its own system overhead; thus multithreading is not always desirable. In general, the goal is to ensure that the prepare stage starts at the beginning of VSYNC pulse to maintain a smooth animation sequence and the corresponding frame-to-frame displacement. In several embodiments, if the combined time to effectuate the prepare stage and rendering stage of the UI workload is small enough to be completed within a VSYNC cycle (e.g., 16.66 ms for 60 Hz panel refresh rate) multithreading is not utilized, and in many embodiments, the UI workload may be selectively multithreaded based on heuristics. In one exemplary embodiment, the threshold is one half of the VSYNC cycle period so that if the prepare stage takes more than half the VSYNC cycle (0.5*VSYNC cycle period), a separate worker thread is utilized for the rendering stage.

Beneficially, on the multicore processor 114, the prepare stage of frame n+1 can always execute in parallel to the rendering stage of previous frame n. As a consequence, the system CPU governor need not be relied upon to run the processor 114 cores 116 at turbo/high frequency instantaneously to handle the sudden increase in the workload. Instead, the workload is split when necessary to allow the workload to complete on different cores 116 which can run at lower clock frequencies; thus there may be power savings in some instances.

Figure 5:
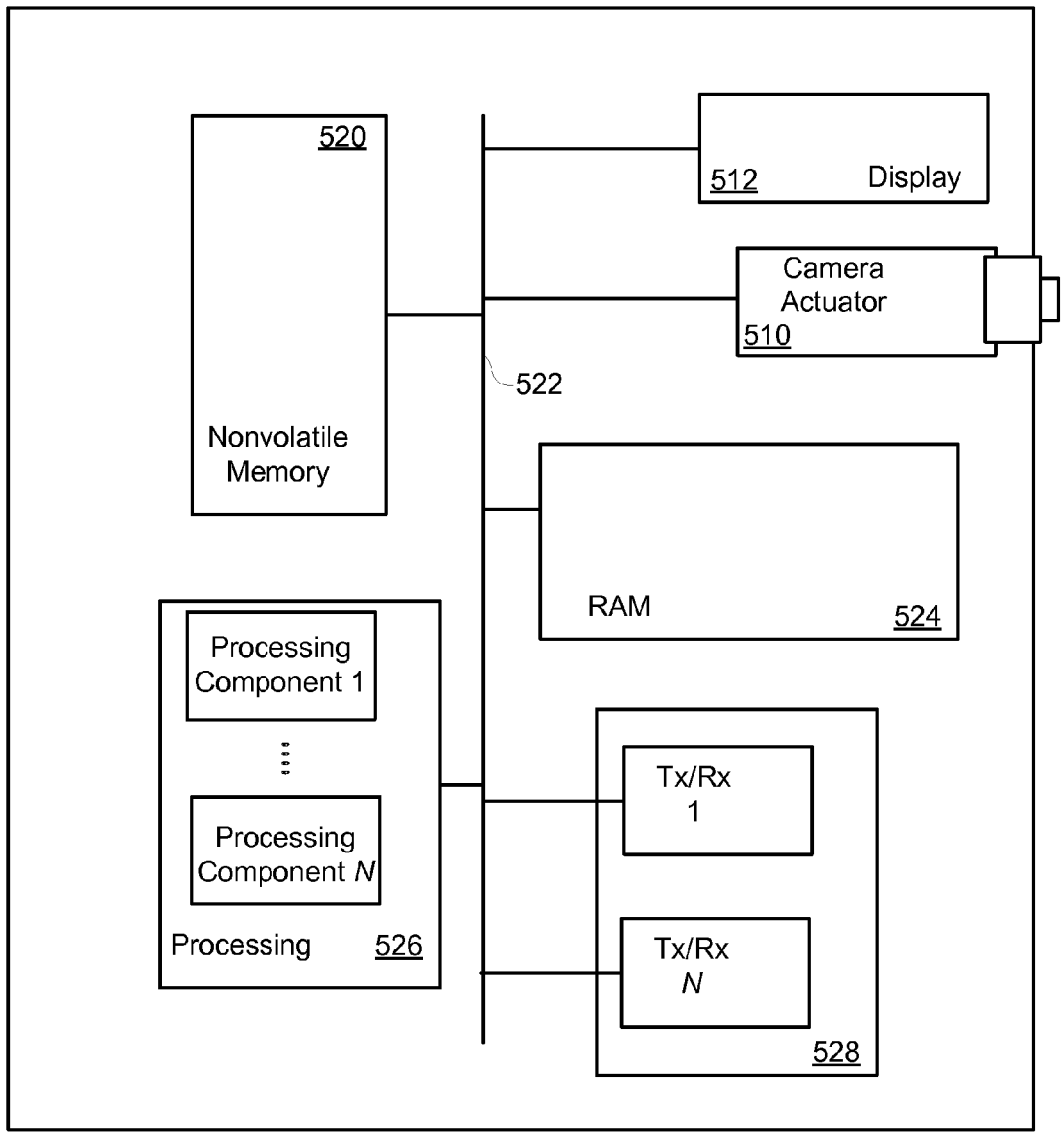
FIG. 5 is a block diagram depicting physical structures that may be utilized in connection with implementing the embodiments disclosed herein.

Referring to FIG. 5, shown is a block diagram depicting exemplary physical components that may be used in connection with realizing the components depicted in FIG. 1. As shown, a camera actuator 510, display portion 512, and nonvolatile memory 520 are coupled to a bus 522 that is also coupled to random access memory ("RAM") 524, a processing portion (which includes N processing components) 526, and a transceiver component 428. Although the components depicted in FIG. 5 represent physical components of a mobile computing device (such as the computing device depicted in FIG. 1) it is not intended to be a hardware diagram; thus many of the components depicted in FIG. 5 may be realized by common constructs or distributed among additional physical components. Moreover, it is certainly contemplated that other existing and yet-to-be developed physical components and architectures may be utilized to implement the functional components described with reference to FIG. 1.

In general, the nonvolatile memory 420 functions to store (e.g., persistently store) data and executable code including code that is associated with the functional components depicted in FIG. 1. In some embodiments of the mobile computing device depicted in FIG. 1 for example, the nonvolatile memory 420 includes bootloader code, modem software, operating system code, file system code, and non-transitory processor executable instructions to implement the workload detection component 118 and the workload division component 120 (in addition to the applications 102, other libraries 106, and the kernel 108).

In many implementations, the nonvolatile memory 520 is realized by flash memory (e.g., NAND or ONENAND™ memory), but it is certainly contemplated that other memory types may be utilized as well. Although it may be possible to execute the non-transitory code from the nonvolatile memory 520, the executable code in the nonvolatile memory 520 is typically loaded into RAM 524 and executed by one or more of the N processing components in the processing portion 526.

The camera actuator 510 in the embodiment depicted in FIG. 5 may be realized by a variety of different types of actuators including voice coil motor (VCM) type actuators, piezoelectric actuators, hybrid actuators, and yet-to-be-developed actuators.

The N processing components 526 in connection with RAM 524 generally operate to execute the instructions stored in nonvolatile memory 520 to effectuate the functional components depicted in FIG. 1. As one of ordinarily skill in the art will appreciate, the processing components 526 may include multiple processor cores (e.g., cores 116) a video processor, modem processor, DSP, graphics processing unit (GPU), and other processing components.

The depicted transceiver component 528 includes N transceiver chains for communicating with external devices. Each of the N transceiver chains represents a transceiver associated with a particular communication scheme. For example, one transceiver chain may operate according to wireline protocols, another transceiver may communicate according to WiFi communication protocols (e.g., 802.11 protocols), another may communicate according to cellular protocols (e.g., CDMA or GSM protocols), and yet another may operate according to Bluetooth protocols. Although the N transceivers are depicted as a transceiver component 528 for simplicity, it is certainly contemplated that the transceiver chains may be separately disposed about the mobile computing device.

This display 512 generally operates to provide text and non-text content (e.g., UI animations) to a user. Although not depicted for clarity, one of ordinary skill in the art will appreciate that other components including a display driver and backlighting (depending upon the technology of the display) are also associated with the display 512.

The architecture depicted in FIG. 5 is exemplary only and one or more of the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing user-interface animations on a computing device, the method comprising:
   processing a first frame of a user-interface animation with a first processing core;
   monitoring an elapsed processing time of the first frame of the user-interface animation relative to a first synchronization pulse;
   processing, if the elapsed processing time exceeds a threshold, a first portion of the first frame with the first processing core and processing a second portion of the first frame with a second processing core; and
   initiating, at substantially a same time as a second synchronization pulse, processing of a next frame of the user-interface animation with the first processing core while the second processing core is processing the second portion of the first frame.

2. The method of claim 1, wherein the user-interface animation is an Android-based user-interface animation and the second portion of the user-interface animation is a render-stage.

3. The method of claim 1, wherein the threshold is one-half of a time period of the synchronization pulse.

4. The method of claim 1, wherein the threshold is a tunable threshold.

5. The method of claim 1, wherein the monitoring includes monitoring the elapsed processing time with a workload detection component implemented in connection with a user-level library.

6. The method of claim 1, wherein processing the first portion includes managing user-interface elements, frame-to-frame displacement calculation, and recording graphics library commands.

7. The method of claim 6, wherein processing the second portion includes executing recorded graphics library commands.

8. A non-transitory, tangible processor readable storage medium, encoded with processor readable instructions to perform a method for processing user-interface animations, the method comprising:
   processing a first frame of a user-interface animation with a first processing core;
   monitoring an elapsed processing time of the first frame of the user-interface animation relative to a first synchronization pulse;
   processing, if the elapsed processing time exceeds a threshold, a first portion of the first frame with the first processing core and processing a second portion of the first frame with a second processing core; and
   initiating, at substantially a same time as a second synchronization pulse, processing of a next frame of the user-interface animation with the first processing core while the second processing core is processing the second portion of the first frame.

9. The non-transitory, tangible processor readable storage medium of claim 8, wherein the user-interface animation is an Android-based user-interface animation and the second portion of the user-interface animation is a render-stage.

10. The non-transitory, tangible processor readable storage medium of claim 8, wherein the threshold is one-half of a time period of the synchronization pulse.

11. The non-transitory, tangible processor readable storage medium of claim 8, wherein the threshold is a tunable threshold.

12. The non-transitory, tangible processor readable storage medium of claim 8, wherein the processor readable instructions, when executed, implement a workload detection component that operates in connection with a user-level library.

13. The non-transitory, tangible processor readable storage medium of claim 8, wherein processing the first portion includes managing user-interface elements, frame-to-frame displacement calculation, and recording graphics library commands.

14. The non-transitory, tangible processor readable storage medium of claim 13, wherein processing the second portion includes executing recorded graphics library commands.

15. A computing device comprising:
   means for processing a first frame of a user-interface animation with a first processing core;

means for monitoring an elapsed processing time of the first frame of the user-interface animation relative to a first synchronization pulse;

means for processing, if the elapsed processing time exceeds a threshold, a first portion of the first frame with the first processing core and a second portion of the first frame with a second processing core; and means for initiating, at substantially a same time as a second synchronization pulse, processing of a next frame of the user-interface animation with the first processing core while the second processing core is processing the second portion of the first frame.

16. The computing device of claim 15, wherein the user-interface animation is an Android-based user-interface animation and the second portion of the user-interface animation is a render-stage.

17. The computing device of claim 15, wherein the threshold is one-half of a time period of the synchronization pulse.

18. The computing device of claim 15, wherein the threshold is a tunable threshold.

19. The computing device of claim 15, wherein the monitoring includes monitoring the processing time with a workload detection component implemented in connection with a user-level library.

* * * * *